US012592966B2

(12) United States Patent
Taneja et al.

(10) Patent No.: US 12,592,966 B2
(45) Date of Patent: Mar. 31, 2026

(54) DYNAMIC FEATURE OPTIMIZATION LEVERAGING QUANTUM SIMULATION FOR FAKE ACCOUNT DETECTION

(71) Applicant: Bank of America Corporation, Charlotte, NC (US)

(72) Inventors: Pushkar Taneja, Hyderabad (IN); Suryanarayana Adivi, Hyderabad (IN); Shailendra Singh, Maharashtra (IN); Venkata Karthik Ryali, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 128 days.

(21) Appl. No.: 18/595,748

(22) Filed: Mar. 5, 2024

(65) Prior Publication Data

US 2025/0350636 A1      Nov. 13, 2025

(51) Int. Cl.
*H04L 9/40*      (2022.01)
*G06F 40/20*      (2020.01)
(Continued)

(52) U.S. Cl.
CPC .......... *H04L 63/1483* (2013.01); *G06F 40/20* (2020.01); *G06N 5/01* (2023.01); (Continued)

(58) Field of Classification Search
CPC ............. G06Q 10/06393; G06Q 40/03; G06Q 20/3823; G06Q 20/4016; G06Q 30/0609; (Continued)

(56) References Cited

U.S. PATENT DOCUMENTS 8,955,129 B2      2/2015  Cao et al.
9,152,746 B2      10/2015  Troyer et al.
(Continued)

FOREIGN PATENT DOCUMENTS

CN      116488838 A      7/2023
CN      116862521 A      10/2023
(Continued)

OTHER PUBLICATIONS

NVIDIA Grace CPU Superchip. Datasheet [online]. NVIDIA Corporation, 2024 [retrieved on Feb. 12, 2024]. Retrieved from the Internet: <URL www.nvidia.com/en-us/data-center/grace-cpu/>.
(Continued)

*Primary Examiner* — Kyung H Shin
(74) *Attorney, Agent, or Firm* — Banner & Witcoff, Ltd.

(57) ABSTRACT

Robust systems and methods are disclosed for fake account detection on digital platforms, integrating provenance analysis to scrutinize data origins, ownership, and history, thereby unveiling potential sources of fraudulent activities. They leverage dynamic feature generation, using advanced algorithms to assess user behaviors and interactions, ensuring the model stays attuned to the evolving landscape of cyber threats. Incorporating Quantum-assisted optimization, the method employs Quantum algorithms to expedite feature selection, enhancing detection efficiency. Quantum simulation further refines this process, creating sophisticated verification patterns and analytical techniques to distinguish genuine from fake accounts with higher accuracy. A comprehensive analysis amalgamates provenance data, telemetry, and dynamic features, forming a holistic detection approach. This system optimizes features through Quantum simulation, tailoring them to specific business environments, and deploys them via AI-ML DevOps, streamlining orchestration across various operational settings.

20 Claims, 9 Drawing Sheets

(51) Int. Cl.

| | |
|---|---|
| *G06N 5/01* | (2023.01) |
| *G06N 10/20* | (2022.01) |
| *G06N 10/60* | (2022.01) |
| *G06Q 10/0639* | (2023.01) |
| *G06Q 20/38* | (2012.01) |
| *H04L 41/16* | (2022.01) |

(52) U.S. Cl.
    CPC ............. *G06N 10/20* (2022.01); *G06N 10/60*
        (2022.01); *G06Q 10/06393* (2013.01); *G06Q*
        *20/3823* (2013.01); *H04L 41/16* (2013.01)

(58) Field of Classification Search
    CPC ........ G06Q 20/389; G06N 20/00; G06N 5/01;
        G06N 10/60; G06N 10/00; G06N 20/20;
        G06N 10/20; G06N 20/10; G06F 18/217;
        G06F 18/214; G06F 18/2113
    See application file for complete search history.

(56)             References Cited

U.S. PATENT DOCUMENTS

| | | | |
|---|---|---|---|
| 9,532,227 | B2 | 12/2016 | Richards et al. |
| 9,537,814 | B2 | 1/2017 | Rubinstein et al. |
| 9,900,346 | B2 | 2/2018 | McGeehan |
| 10,009,358 | B1 | 6/2018 | Xie et al. |
| 10,129,288 | B1 | 11/2018 | Xie et al. |
| 10,523,648 | B2 | 12/2019 | Callaghan |
| 10,609,048 | B2 | 3/2020 | Be'ery et al. |
| 10,708,300 | B2 | 7/2020 | Rodrigues |
| 11,102,244 | B1 | 8/2021 | Jakobsson et al. |
| 11,551,228 | B2 | 1/2023 | Goodsitt et al. |
| 11,862,339 | B2 | 1/2024 | Wall et al. |
| 2007/0297409 | A1 | 12/2007 | Chiu et al. |
| 2011/0102141 | A1 | 5/2011 | Wu |
| 2017/0134423 | A1 | 5/2017 | Sysman et al. |
| 2018/0309787 | A1 | 10/2018 | Evron et al. |
| 2019/0268358 | A1 | 8/2019 | McClintock et al. |
| 2019/0295087 | A1 | 9/2019 | Jia et al. |
| 2022/0374784 | A1* | 11/2022 | Sharma .................... G06N 5/01 |
| 2023/0126764 | A1* | 4/2023 | Ibrahim ................. G06N 10/20 |
| | | | 705/44 |
| 2023/0141624 | A1* | 5/2023 | Chau ............... G06Q 10/06393 |
| | | | 705/7.39 |
| 2024/0354750 | A1* | 10/2024 | Almasan ............ G06Q 20/3823 |

FOREIGN PATENT DOCUMENTS

| | | |
|---|---|---|
| EP | 3136311 A1 | 3/2017 |
| RU | 2502134 C2 | 12/2013 |
| TW | 201640456 A | 11/2016 |

OTHER PUBLICATIONS

Top 7 ML Model Monitoring Tools in 2024 [online]. QWAK, 2024 [retrieved on Feb. 12, 2024]. Retrieved from the Internet: <URL https://www.qwak.com/post/top-ml-model-monitoring-tools>.

* cited by examiner

Architecture Diagram

Quantum Feature Optimization Engine - 200

Dynamic Feature Optimization - 300

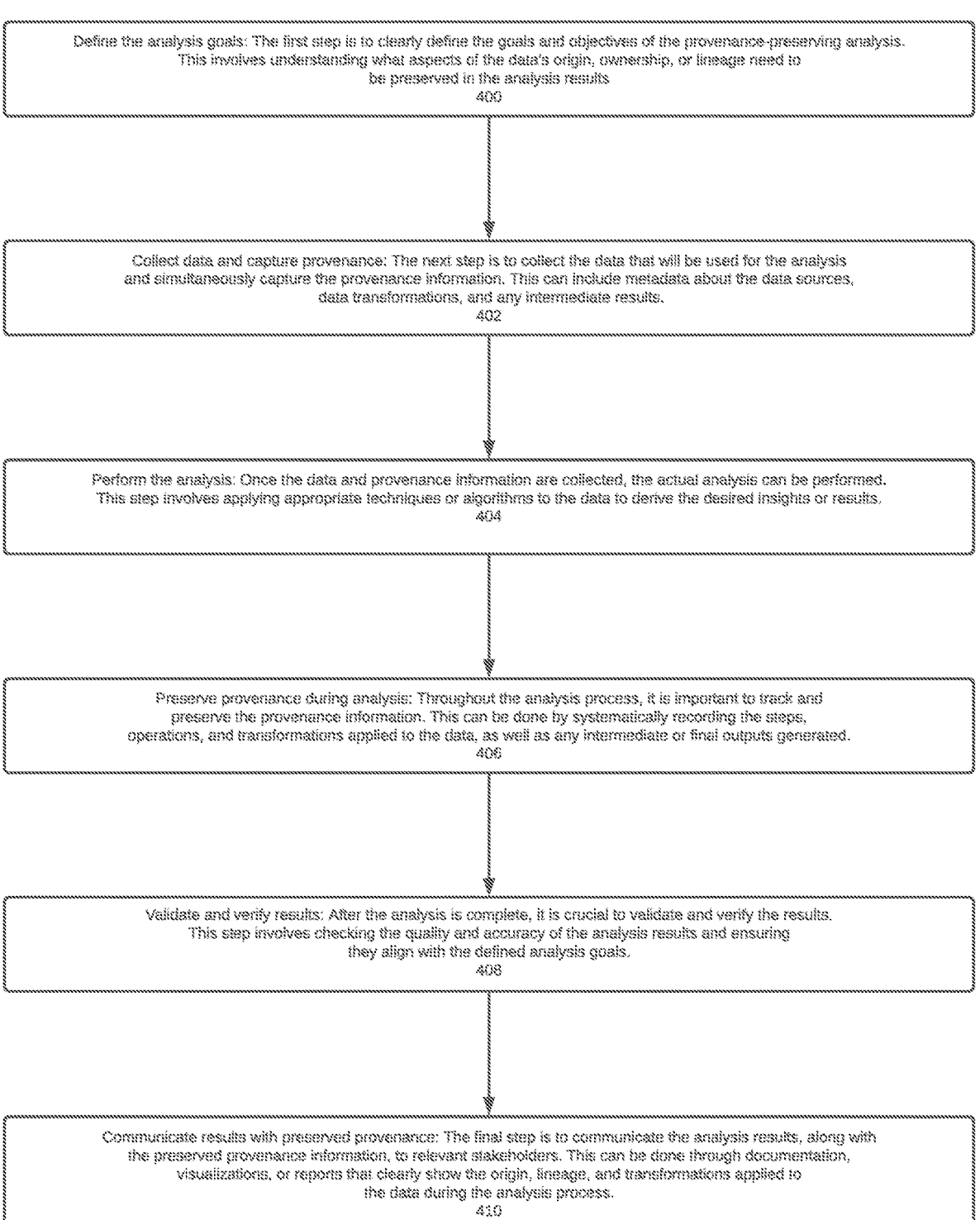

Provenance- Preserving Analysis

Define the analysis goals: The first step is to clearly define the goals and objectives of the provenance-preserving analysis. This involves understanding what aspects of the data's origin, ownership, or lineage need to be preserved in the analysis results
400

Collect data and capture provenance: The next step is to collect the data that will be used for the analysis and simultaneously capture the provenance information. This can include metadata about the data sources, data transformations, and any intermediate results.
402

Perform the analysis: Once the data and provenance information are collected, the actual analysis can be performed. This step involves applying appropriate techniques or algorithms to the data to derive the desired insights or results.
404

Preserve provenance during analysis: Throughout the analysis process, it is important to track and preserve the provenance information. This can be done by systematically recording the steps, operations, and transformations applied to the data, as well as any intermediate or final outputs generated.
406

Validate and verify results: After the analysis is complete, it is crucial to validate and verify the results. This step involves checking the quality and accuracy of the analysis results and ensuring they align with the defined analysis goals.
408

Communicate results with preserved provenance: The final step is to communicate the analysis results, along with the preserved provenance information, to relevant stakeholders. This can be done through documentation, visualizations, or reports that clearly show the origin, lineage, and transformations applied to the data during the analysis process.
410

FIG. 4

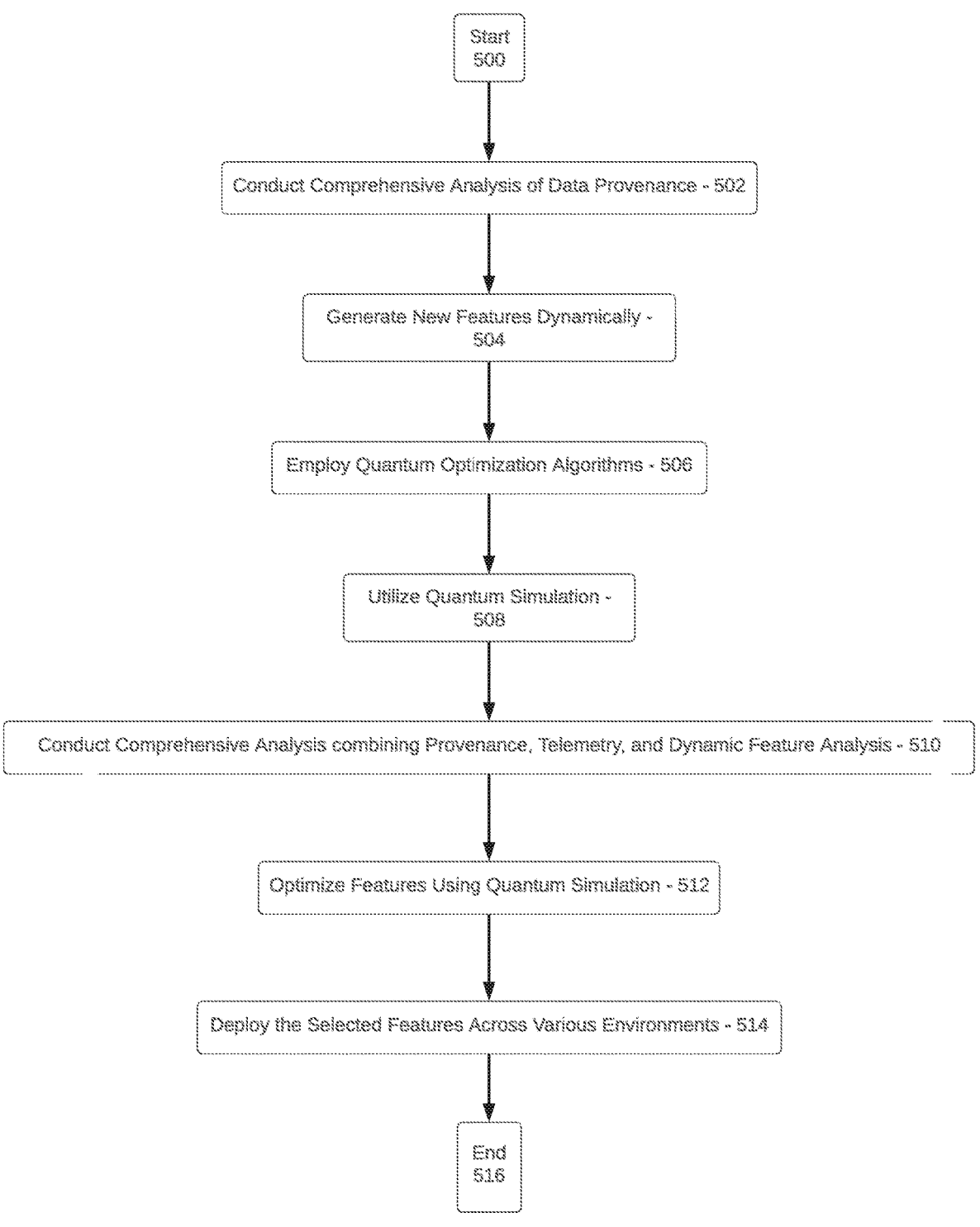

Start
500

Conduct Comprehensive Analysis of Data Provenance - 502

Generate New Features Dynamically - 504

Employ Quantum Optimization Algorithms - 506

Utilize Quantum Simulation - 508

Conduct Comprehensive Analysis combining Provenance, Telemetry, and Dynamic Feature Analysis - 510

Optimize Features Using Quantum Simulation - 512

Deploy the Selected Features Across Various Environments - 514

End
516

FIG. 5

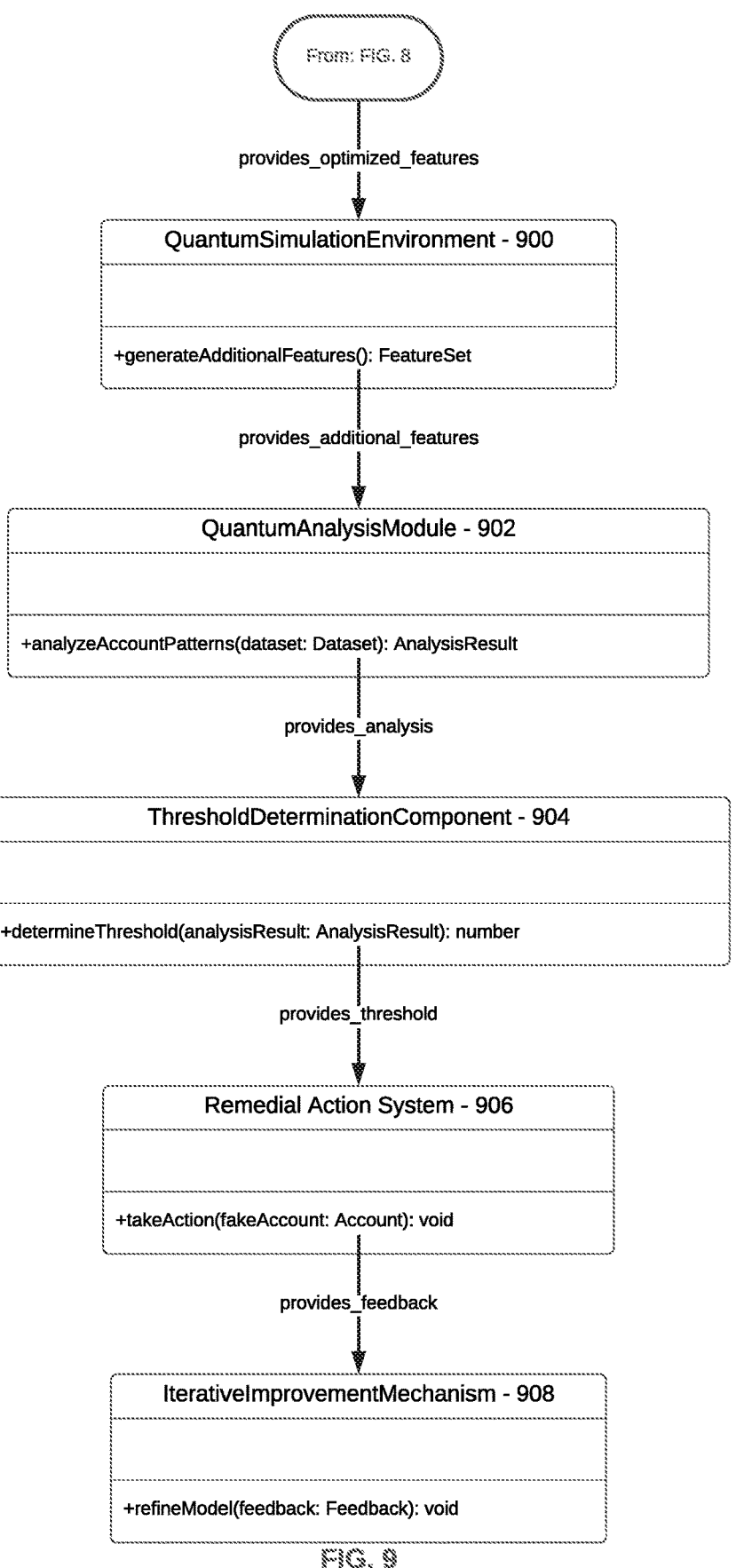

provides_optimized_features

QuantumSimulationEnvironment - 900

+generateAdditionalFeatures(): FeatureSet provides_additional_features

QuantumAnalysisModule - 902

+analyzeAccountPatterns(dataset: Dataset): AnalysisResult provides_analysis

ThresholdDeterminationComponent - 904

+determineThreshold(analysisResult: AnalysisResult): number provides_threshold

Remedial Action System - 906

+takeAction(fakeAccount: Account): void provides_feedback

IterativeImprovementMechanism - 908

+refineModel(feedback: Feedback): void

FIG. 9

DYNAMIC FEATURE OPTIMIZATION LEVERAGING QUANTUM SIMULATION FOR FAKE ACCOUNT DETECTION

TECHNICAL FIELD

This disclosure pertains to Data Processing: Artificial Intelligence and, more specifically to cybersecurity utilizing artificial intelligence (AI) and machine learning (ML) for the detection and prevention of fake account creation on digital platforms.

DESCRIPTION OF THE RELATED ART

Fake accounts, intricately designed to mimic real users, present a multifaceted threat within the digital ecosystem. They serve not just as vessels for misinformation but as tools for a broader spectrum of malicious activities. These accounts undermine the foundational trust users place in online interactions, skewing social media metrics and misleading both users and advertisers about genuine engagement levels. Beyond the realm of social manipulation, they are pivotal in executing sophisticated phishing schemes, aiming to deceitfully acquire sensitive personal and financial information. The ramifications extend into the commercial sphere, where businesses face unjust tarnishing of reputations through orchestrated campaigns of false reviews or slanderous content. In more personalized settings, such as online dating, they facilitate deceptive practices like catfishing, targeting emotional vulnerabilities. The strategic deployment of these accounts in cyberbullying and harassment campaigns further exacerbates their threat, contributing to a hostile online environment. Addressing the pervasive challenge they present requires innovative and dynamic detection mechanisms to safeguard online integrity and user safety, making the battle against fake accounts a critical front in maintaining digital security and trustworthiness.

Fake accounts are deceptive profiles created on various online platforms, which can be automated bots or manually operated by individuals with malicious intent. They pose significant problems for several reasons:

a. Misinformation and Propaganda: They can spread false information and propaganda, affecting public opinion and even election outcomes.

b. Scams and Phishing: These accounts often engage in scams, tricking users into revealing personal or financial information.

c. Inflated Metrics: They can artificially inflate engagement metrics (likes, followers), misleading users and advertisers about a platform's actual popularity or engagement.

d. Reputation Damage: Fake accounts can damage the reputation of individuals, businesses, and brands by spreading false claims or reviews.

e. Security Threats: They represent security risks, as they can be used in coordinated attacks against websites or online services.

f. Social Manipulation and Harassment: These accounts can harass individuals, spread hate speech, or manipulate social interactions.

Their pervasive presence undermines trust in online platforms, necessitating advanced detection and mitigation strategies to maintain the integrity and safety of digital spaces.

Additionally, with respect to real-time scenarios of fake account creation in the realm of digital interactions, fake account creation poses significant threats across various platforms, each with unique consequences:

a. Social Media: Utilized for disseminating misinformation, swaying public opinion, or executing frauds like identity theft, these accounts distort reality and attack users.

b. Online Reviews: By posting fabricated reviews, they manipulate perceptions of businesses or products, affecting their success or failure.

c. Contests and Giveaways: They unfairly tilt competition odds, undermining the integrity of promotional activities.

d. Cyberbullying: Anonymity shields malicious actors, facilitating harassment without accountability.

e. Impersonation: Posing as others, these accounts engage in deceitful schemes for financial or personal gain.

f. Online Dating: Targeting emotional vulnerabilities, they deceive users seeking genuine connections.

g. Spamming and Phishing: Employed in mass unsolicited messaging and sophisticated scams, they aim to extract sensitive information.

Addressing these challenges necessitates the development of dynamic AI-ML feature optimization mechanisms tailored to specific business scenarios, enhancing the rapid deployment and effectiveness of digital security measures.

SUMMARY OF THE INVENTION

The invention(s) disclosed herein focus on enhancing fake account detection through Quantum simulation for dynamic feature optimization. They aim to improve detection accuracy by analyzing user data, generating new features through algorithms, and optimizing these features using Quantum simulation. An aspect is provenance analysis, which examines the data's origin to identify fake account sources. The invention(s) also leverage Quantum-assisted optimization to expedite feature selection, incorporating real-time verification and analysis techniques to reduce false positives. This comprehensive approach ensures a robust detection system by combining provenance, dynamic feature analysis, and Quantum computing advancements, aiming for efficient and accurate fake account identification in various environments, including production.

As explained herein, novel approaches for detecting and mitigating fake account creation on digital platforms are provided that leverage advanced AI and Quantum computing techniques. They introduce a dynamic feature optimization process using Quantum simulation, which significantly enhances the accuracy and efficiency of fake account detection systems. The invention(s) employs a combination of data analysis, user behavior modeling, and Quantum algorithms to identify and address the nuances of fake account activities more effectively than existing solutions.

An aspect of the technology is its ability to analyze vast datasets rapidly, enabling real-time detection and response to fraudulent activities. By integrating Quantum computing, the system can process information at unprecedented speeds, reducing the time required for feature optimization and analysis. This rapid processing capability adapts to the ever-evolving tactics employed by malicious actors in creating fake accounts.

The invention(s) also include provenance analysis in identifying the origins of data, providing valuable insights into the creation patterns of fake accounts. This approach allows for a more targeted detection strategy, focusing on the root causes and sources of fraudulent activities rather than just the symptoms.

Furthermore, the system utilizes a sophisticated algorithm to generate and optimize new features dynamically, based on the ongoing analysis of user data and behavior patterns. This ensures that the detection mechanism remains effective even as fraudsters adapt their strategies.

Quantum-assisted optimization plays a role in selecting the most relevant features for detecting fake accounts, streamlining the process, and enhancing the system's overall performance. This optimization process is not only faster but also more accurate, leading to a significant reduction in false positives and negatives.

The real-time verification and analysis component of the invention(s) ensures that detected threats are promptly and accurately validated, minimizing the impact on legitimate users while swiftly neutralizing potential risks. This immediate response capability helps in maintaining user trust and platform integrity.

By combining provenance analysis with dynamic feature analysis and Quantum computing advancements, the invention(s) provide a comprehensive solution to the challenge of fake account detection. They address both the technical and behavioral aspects of the problem, offering a multi-faceted approach to cybersecurity.

The system's adaptability to different environments, including production, demonstrates its versatility and potential for wide-ranging applications across various digital platforms. This flexibility ensures that the technology can be effectively implemented in diverse settings, from social media to e-commerce sites.

The invention(s) present a sophisticated method for identifying and neutralizing fake accounts on digital platforms through advanced Quantum simulation techniques. This strategy significantly enhances the precision and speed of detecting fraudulent activities by integrating extensive data analytics, user behavior examination, and innovative Quantum algorithms. The system's capability for swift data processing, powered by Quantum technology, is essential for immediate identification and mitigation of fraud, crucial in an era where threats rapidly evolve.

Through the analysis of data origins, the invention(s) pinpoint the genesis of fraudulent behaviors, enabling a focused approach to detection. It dynamically evolves, generating new detection features based on continuous analysis of user interactions, ensuring the system's resilience against the adaptive nature of threats. The method employs Quantum computing for efficient feature selection, minimizing the occurrence of false identifications.

An integral part of the system is its capacity for instant verification of potential threats, ensuring that legitimate users remain unaffected while promptly addressing any detected risks. This balanced approach underscores a comprehensive cybersecurity methodology that marries technical prowess with a deep understanding of user behavior patterns.

Adaptable across various platforms, the invention's versatility underscores its potential as a universal solution in the cybersecurity domain. It marks a significant step forward in the battle against digital fraud, leveraging the intersection of Quantum computing and artificial intelligence to set new benchmarks in online security measures.

The invention(s) enhance fake account detection through advanced methods including:

a. Provenance Analysis: This involves a deep dive into the data's origin, ownership, and history, aiming to uncover the roots of fake accounts and suspicious activities. By understanding where and how data is generated, it is possible to trace and flag potential fraudulent sources effectively.

b. Dynamic Features Generation: Utilizes algorithms for creating new detection features on-the-fly, based on real-time data analysis. This adaptability ensures the detection system remains effective against evolving tactics used in fake account creation, incorporating variables like event recency, pattern recognition, and user interactions.

c. Quantum-Assisted Optimization: Employs Quantum computing techniques, such as Quantum Annealing, for superior feature selection. The parallel processing capabilities of Quantum computing allow for exploring numerous feature combinations simultaneously, optimizing the detection process both in speed and accuracy.

d. Quantum Simulation: Leverages Quantum computing to simulate advanced detection features, facilitating sophisticated analysis methods like real-time and peer comparison verification, content, and behavioral analysis, and more. This contributes significantly to reducing false positives while increasing detection precision.

e. Comprehensive Analysis: Combines the strengths of provenance, telemetry, and dynamic feature analysis for a thorough approach to fake account detection. By analyzing a wide range of factors and data points, the system achieves a more robust and holistic understanding, improving its ability to identify fraudulent accounts.

f. Method Optimization and Deployment: The invention(s) utilize Quantum simulation to refine and select the most effective feature schema for the current business environment. The chosen features are then deployed across various platforms, including production environments, through AI-ML DevOps processes, ensuring a streamlined and effective implementation.

Overall, this detailed approach, by integrating Quantum computing's power with real-time optimization, dynamic feature generation, and comprehensive analysis, aims to significantly improve the detection of fake accounts. Through these innovative methods, the system not only boosts accuracy and efficiency but also adapts to the continuously changing landscape of online fraud and account falsification.

Considering the foregoing, the following presents a simplified summary of the present disclosure to provide a basic understanding of various aspects of the disclosure. This summary is not limiting with respect to the exemplary aspects of the invention(s) s described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a method for detecting fake accounts on digital platforms includes conducting a thorough analysis of data provenance to identify potentially fraudulent activities by tracing data's origin and history. This method further involves dynamically generating new features using various analytical algorithms to improve fake account detection based on user behaviors and interactions. Quantum optimization algorithms, such as Quantum Annealing, are utilized to refine the feature selection process, taking advantage of Quantum computing's ability to handle complex computations efficiently. Quantum simulation plays a crucial role in creating advanced features for real-time verification, enhancing the accuracy of fraud detection while minimizing false positives. The approach integrates provenance, telemetry, and dynamic feature analysis for comprehensive detection, and optimizes features through Quantum simulation for deployment across different environments via AI-ML DevOps, ensuring adaptability to current business needs.

In some arrangements, the method enhances the detection of fake accounts on digital platforms by introducing a filtering mechanism that prioritizes data sources with a historical association with fraudulent activities. This refined approach incorporates a machine learning model within the dynamic feature generation process, which adjusts its parameters based on the outputs from the filtering mechanism. Quantum optimization algorithms are tailored to favor features strongly correlated with fake account detection. Additionally, a feedback loop from Quantum simulation results further refines the feature generation, incorporating environmental variables to mimic real-world conditions. The comprehensive analysis results are integrated into a dashboard for real-time authenticity monitoring. Anomaly detection algorithms, updated in real-time from Quantum simulation data, work alongside these features to spot deviations from normal behavior. The system automatically adjusts the detection threshold based on the severity and frequency of detected fraudulent activities. Finally, the optimized features are deployed across multiple platforms simultaneously, leveraging cloud-based AI-ML DevOps tools for scalable and prompt threat mitigation.

In some arrangements, a system for detecting fake accounts on digital platforms incorporates a comprehensive approach, starting with a data collection module that gathers varied user information to differentiate between genuine and fake profiles. It includes a feature extraction module that identifies distinct behaviors and profile characteristics, and a dynamic feature generation module that uses advanced algorithms for creating new detection features. To ensure data privacy, a provenance-preserving analysis component is implemented. Quantum optimization and simulation techniques are utilized to enhance feature selection and generate additional detection capabilities, supported by a Quantum analysis module for in-depth account examination. The system also features a threshold determination component for account classification, remedial action mechanisms for addressing detected accounts, and an iterative improvement process for continuous refinement of the detection model.

In some arrangements, the data collection module is enhanced with filters to selectively gather data based on specific user activities and engagement levels. Following this, the feature extraction module employs machine learning algorithms that dynamically adapt and refine features as fake account behaviors evolve. The dynamic feature generation module incorporates time-series analysis to detect trends in user behavior and account activity over time. To secure data during processing, the provenance-preserving analysis component utilizes encryption and hashing. The Quantum optimization mechanism is designed to perform under various conditions to find robust feature combinations against adversarial attacks. Additionally, the Quantum simulation environment is flexible, allowing for the integration of new verification patterns. Lastly, an iterative improvement mechanism leverages feedback from detected inaccuracies and accounts to continually improve the detection algorithm's accuracy and performance.

In some arrangements, a method for detecting fake accounts on digital platforms involves a multi-step process that starts with a thorough analysis of data provenance to identify potentially fraudulent activities by tracing data's origin, ownership, and processing history. This analysis is detailed, involving setting clear goals, collecting data alongside its provenance information, and applying specific analytical techniques to glean insights. Throughout this process, provenance information can be meticulously preserved and documented to validate the analysis results, which are then communicated to stakeholders. Additionally, the method includes generating dynamic features using various algorithms, employing Quantum optimization to enhance feature selection, utilizing Quantum simulation for advanced feature generation, and conducting a holistic analysis by merging provenance, telemetry, and dynamic feature insights. The culmination of this process involves optimizing these features through Quantum simulation for deployment across multiple platforms, ensuring the method's adaptability to different business conditions and its effectiveness in orchestrating through AI-ML DevOps tools.

Overall, the invention represents a significant leap forward in the fight against online fraud and malicious activities. Its innovative use of Quantum computing to enhance AI-driven detection systems sets a new standard for cybersecurity measures, offering a promising solution to a pervasive and evolving threat.

This technology not only improves the security and reliability of digital platforms but also paves the way for further advancements in the application of Quantum computing in artificial intelligence and cybersecurity.

In some arrangements, the method for detecting fake accounts on digital platforms involves a series of sophisticated steps aimed at enhancing the accuracy and efficiency of identifying fraudulent activities. Initially, a comprehensive analysis of data provenance is conducted to trace the origin, ownership, and processing history of data, capturing metadata about data sources, transformations, and intermediate results to preserve the data's lineage. This step enables understanding the roots of potential fraud. Following this, new detection features are dynamically generated based on real-time analysis of user behaviors and interactions, utilizing algorithms designed to adapt to the evolving tactics employed by fraudulent accounts. To refine the feature selection process, Quantum optimization algorithms, including Quantum Annealing, are utilized, leveraging the parallel processing capabilities of Quantum computing to explore and optimize multiple feature combinations simultaneously. Further sophistication is added through Quantum simulation, which generates advanced detection features and facilitates methods like real-time verification, peer comparison, content analysis, and behavioral analysis, thus improving the accuracy of fraud detection while minimizing false positives. A comprehensive analysis integrates provenance, telemetry, and dynamic feature analysis, developing a holistic understanding of fraudulent account activities and enhancing the detection system's robustness. The generated features are then optimized through Quantum simulation for deployment across various digital environments, selecting the most effective feature schema for current business conditions and employing AI-ML DevOps for efficient feature deployment. Finally, a real-time verification and analysis component is implemented to ensure the prompt and accurate validation of detected threats, minimizing the impact on legitimate users, and swiftly neutralizing potential risks as it adapts to continuously changing tactics by malicious actors.

In some arrangements, the dynamic feature generation process is enhanced through the incorporation of machine learning models. These models adjust detection features in response to insights gained from both data provenance analysis and real-time user data analysis, ensuring the system's effectiveness against the adaptive strategies of fraudulent accounts. Additionally, a filtering mechanism is introduced to prioritize data sources known for historical fraudulent activities, thereby refining the feature generation process through adjustments in the machine learning model parameters based on historical data analysis. The Quantum-assisted optimization is tailored to focus on detection features strongly correlated with indicators of fake accounts, with a feedback loop from Quantum simulation results enabling continuous improvement of feature generation and selection according to environmental variables and real-world conditions.

In some arrangements, the deployment of these optimized features across multiple platforms leverages cloud-based AI-ML DevOps tools, allowing for scalable and prompt adjustments in response to detected fraudulent activities and facilitating effective threat mitigation. To enhance data security during processing, the comprehensive analysis of data provenance employs encryption and hashing techniques, safeguarding user information, and maintaining the integrity and authenticity of the analysis. The dynamic feature generation process also employs a machine learning model capable of self-adjustment based on continuous feedback from Quantum simulation results, thus improving the model's ability to detect fake accounts as fraudulent tactics evolve.

In some arrangements, further advancements can include the use of Quantum simulation to generate advanced detection features by simulating adversarial attack scenarios, testing, and improving the resilience of detection features against sophisticated fraud techniques. Anomaly detection algorithms, updated in real-time with data from Quantum simulations, are integrated to identify deviations from normal user behavior, automatically adjusting detection thresholds based on the severity and frequency of detected fraudulent activities. Finally, the deployment process is designed to support incremental updates without system downtime, ensuring that detection capabilities can be dynamically updated in response to emerging threats with minimal disruption to platform operations.

In some arrangements, the method for enhancing the detection of fake accounts on digital platforms integrates Quantum computing with artificial intelligence technologies to create a sophisticated detection system. It begins with a data provenance analysis that systematically traces and documents the data's origin, ownership, and historical changes, employing advanced cryptographic techniques to safeguard the data's confidentiality and integrity. This analysis aims to identify potential sources of fraudulent activities. An algorithmic process dynamically generates detection features by analyzing real-time user behaviors, interactions, and engagement patterns, with machine learning models adjusting detection parameters as online behaviors evolve. Quantum optimization algorithms, including Quantum Annealing and the Quantum Approximate Optimization Algorithm (QAOA), expedite the feature selection process through parallel computations, significantly enhancing the efficiency and accuracy of feature selection.

Quantum simulation techniques are then engaged to develop and refine advanced detection features, enabling the simulation of adversarial scenarios to test the system's resilience against novel fraud techniques. This process facilitates the creation of features capable of sophisticated analyses, such as real-time verification and behavioral analysis. A comprehensive and integrated analysis merges insights from data provenance, telemetry data, and the optimized features to form a robust understanding of the digital environment, ensuring a nuanced approach to fake account detection. The features are further optimized through Quantum simulations, focusing on minimizing false positives and negatives to ensure the detection process's reliability.

The optimized features are deployed across various digital platforms via an automated AI-ML DevOps pipeline, allowing for seamless integration and continuous deployment. This system remains agile, with provisions for incremental updates and real-time adjustments without system downtime. Finally, a real-time verification and analysis component employs these features to quickly identify and validate potential threats, incorporating a feedback mechanism that facilitates continuous system improvement based on the outcomes of verified threats. This comprehensive method ensures high accuracy and effectiveness in detecting fake accounts, minimizing the impact on legitimate users and platform operations.

In some arrangements, the process is further enhanced by integrating artificial intelligence (AI)-based anomaly detection algorithms within the data provenance analysis. These algorithms are designed to automatically identify data inconsistencies and potential fraudulent patterns, significantly improving the initial filtering process for spotting suspicious activities and sources of fake accounts. Additionally, the dynamic generation of detection features is augmented by employing natural language processing (NLP) techniques. This allows for the analysis of textual content within user interactions, facilitating sentiment analysis, keyword spotting, and contextual understanding, thus bolstering the system's capability to detect nuanced and sophisticated fraudulent activities through content analysis.

The Quantum optimization algorithms employed in this method are meticulously tailored to give priority to features that have shown effectiveness in identifying emerging threats. This is achieved by incorporating a machine learning feedback loop that dynamically adjusts feature prioritization in alignment with the latest trends in fraudulent behavior, as identified through continuous analysis and Quantum simulation results. Moreover, the Quantum simulation phase of refining advanced detection features includes a specific component designed to simulate social network structures and interaction patterns. This simulation aims to uncover and understand the spread and influence mechanisms among fake accounts, aiding in the creation of features adept at detecting coordinated inauthentic behavior across the platform.

Finally, the method incorporates the deployment of an adaptive threshold setting mechanism within the real-time verification and analysis component. This mechanism is crucial for adjusting the sensitivity of the detection system in response to the current dynamics and threat levels on the platform. By doing so, it ensures an optimal balance between accurately detecting fake accounts and minimizing false positives, thus preserving user trust, and maintaining the integrity of the digital platform. This comprehensive approach, through successive enhancements, ensures a robust, adaptable, and highly effective system for identifying and mitigating the impact of fake accounts.

In some arrangements, a system designed for detecting fake accounts on digital platforms integrates a suite of sophisticated components to ensure comprehensive and accurate identification of fraudulent activities. At its core, the Data Provenance Module meticulously traces, documents, and analyzes data's origin, ownership, and historical changes, utilizing cryptographic techniques to safeguard data confidentiality and integrity. This module is further enhanced with AI-based anomaly detection algorithms to pinpoint suspicious activities effectively. To adaptively generate detection features that reflect current user behaviors and engagement patterns, the Dynamic Feature Generation Engine employs real-time analytics and machine learning models, incorporating natural language processing (NLP) techniques for a deeper analysis of textual content.

Central to the system's capability is the Quantum Computing Module, which houses Quantum optimization algorithms, including Quantum Annealing and the Quantum Approximate Optimization Algorithm (QAOA). These algorithms are pivotal in accelerating the feature selection process, enabling the exploration of extensive combinations of potential features through parallel computations. A feedback loop mechanism allows for dynamic adjustments in response to newly emerging fraud trends. The Quantum Simulation Unit further bolsters the system's efficacy by creating and refining advanced detection features for sophisticated analyses such as real-time verification and behavioral analysis. It also simulates adversarial scenarios to enhance the system's resilience against sophisticated fraud techniques and includes a component for simulating social network structures to detect coordinated inauthentic behavior.

An Integrated Analysis System consolidates insights from the Data Provenance Module, telemetry data, and features generated and optimized across the system, fostering a nuanced understanding of the digital environment to enhance fake account detection. The deployment of these optimized features is streamlined through an AI-ML DevOps Pipeline, ensuring seamless integration, continuous updates, and real-time adjustments across various digital platforms without causing system downtime. Lastly, a Real-time Verification and Analysis Component, equipped with the latest deployed features, identifies, and validates potential threats. This component adjusts detection sensitivity in real-time based on platform dynamics and incorporates a feedback mechanism for ongoing system enhancements based on the analysis of verified threats, thereby maintaining high accuracy and effectiveness in the detection process.

In some arrangements, enhancements can be made to the effectiveness and security of the system. The system can include an Enhanced Security Layer within the Data Provenance Module. This layer utilizes advanced encryption standards (AES) and secure hashing algorithms (SHA) to protect the privacy and integrity of data throughout the tracing and documenting process. Additionally, a Behavioral Anomaly Detection Subsystem has been integrated into the Real-time Verification and Analysis Component. This subsystem employs deep learning models to automatically detect and alert on unusual user behavior patterns indicative of fake account activities, utilizing continuous learning from detected anomalies to progressively refine the accuracy of detection over time.

Further enhancements to the Dynamic Feature Generation Engine can be implemented. A Sentiment Analysis Unit, employing advanced NLP models, has been introduced to analyze emotional tones and intentions in textual content.

This unit is instrumental in identifying manipulative or deceptive language patterns common in fake account interactions. Additionally, a Contextual Analysis Module has been developed to interpret the significance of user interactions within specific platform contexts, thereby enhancing the engine's capability to generate features that pinpoint sophisticated indicators of fake accounts based on contextual relevance.

The system has also been equipped with a Cross-Platform Integration Framework. This framework enables the detection capabilities to be extended across multiple digital platforms by standardizing feature generation, optimization, and deployment processes. This facilitates the sharing of intelligence and detection strategies among different platforms, fostering a more unified and effective approach to combating fake accounts. Moreover, a User Feedback Collection Module has been designed to gather direct input from platform users about suspected fake accounts. This user-generated data is incorporated into the Real-time Verification and Analysis Component, enriching the detection mechanisms with human insights and significantly improving the system's adaptability and effectiveness under real-world conditions.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise. Further, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

BRIEF DESCRIPTION OF DRAWINGS

FIG. 4 depicts a sample functional flow diagram in accordance with one or more fake-account detection aspects of this disclosure as it relates to provenance preserving analysis.

FIG. 5 depicts a sample functional process diagram in accordance with one or more fake-account detection aspects of this disclosure.

FIGS. 8-9 collectively depict a class diagram for a sample system in accordance with one or more fake-account detection aspects of this disclosure.

DETAILED DESCRIPTION

Figure 1:
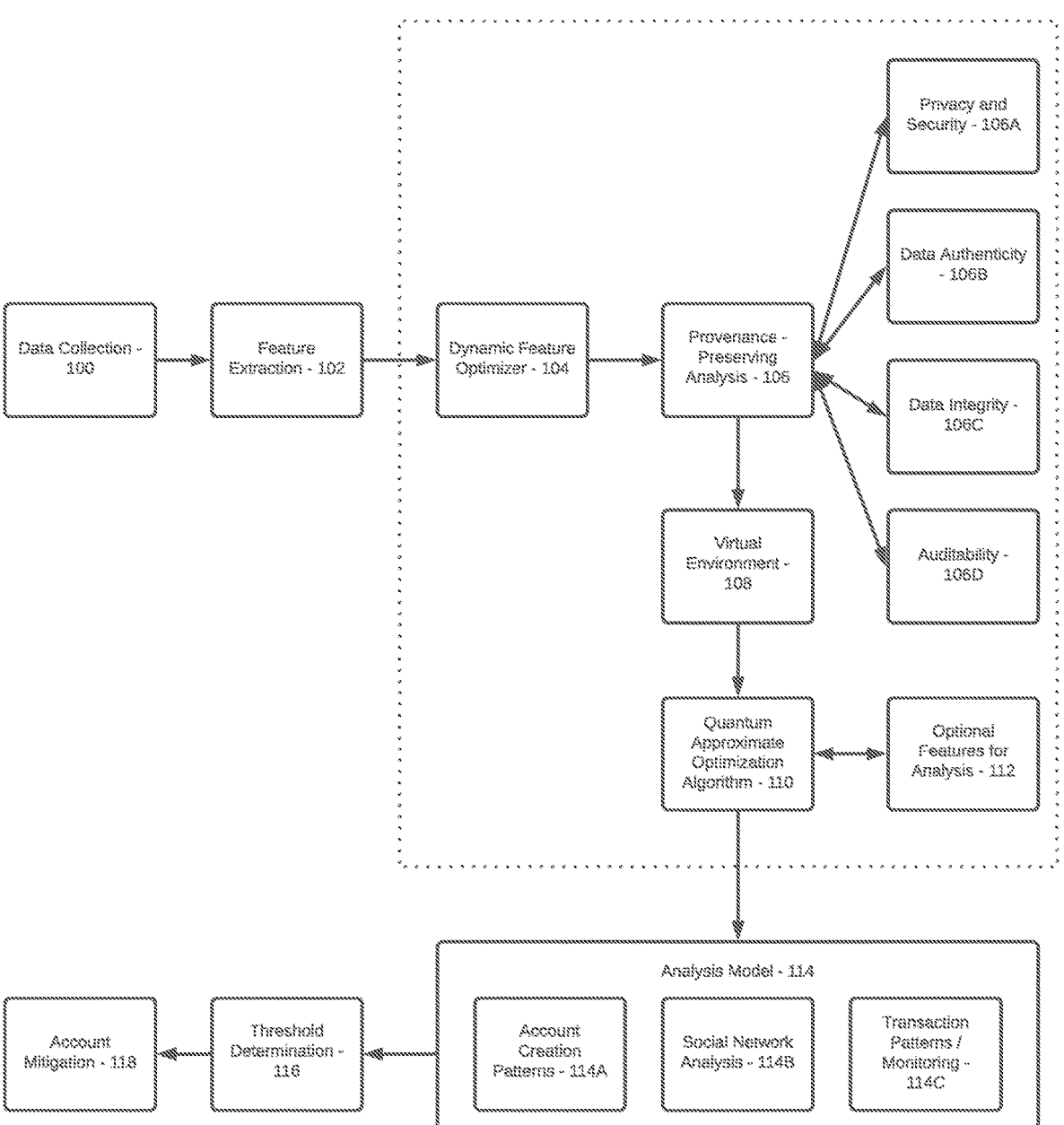
FIG. 1 depicts an architecture diagram showing sample interactions, interfaces, steps, functions, and components in accordance with one or more fake-account detection aspects of this disclosure.

The subsequent description of different embodiments aims to achieve the aforementioned goals, with reference to accompanying drawings that are integral to this document. These drawings illustrate several ways in which the disclosed information can be implemented. It should be recognized that alternative embodiments are possible, and modifications to structure and function can be made. This description mentions various connections between elements, which should be understood as broad and, unless otherwise indicated, can be direct or indirect, wired, or wireless. This specification is not meant to restrict these connections.

Throughout this document, the term "computers," "machines," or similar references are used interchangeably, depending on the context, to denote devices that may be general-purpose, customized, configured for specific purposes, virtual, physical, or capable of accessing networks. These include all associated hardware, software, and components as would be recognized by someone skilled in the field. Such devices might be equipped with one or more application-specific integrated circuits (ASICs), microprocessors, cores, or executors for running, accessing, controlling, or implementing various software, instructions, data, modules, processes, or routines as described herein. The references in this text are not to be seen as restrictive or exclusive to any particular type(s) of electronic device(s) or component(s) and should be understood in the broadest sense as per the knowledge of skilled individuals. Details on specific or general computer/software components, machines, etc., are omitted for conciseness and because they are assumed to be within the understanding of competent professionals in the field.

Software, computer-executable instructions, data, modules, processes, and similar elements can reside on physical storage media that is tangible and computer readable. This includes local memory, network-attached storage, and various forms of accessible memory whether removable, remote, cloud-based, or available through other means. Such elements can be stored in either volatile or non-volatile memory types and can operate in various modes such as autonomously, on-demand, on a schedule, spontaneously, proactively, or reactively. They may be stored collectively or dispersed across different computers or devices, encompassing their memory and additional components. Furthermore, these elements can also be stored or distributed across network-accessible storages, within distributed databases, big data environments, blockchains, or distributed ledger technologies, either in a similar fashion or via distributed means.

In this disclosure, the term "networks" or the like encompasses a variety of communication infrastructures, including local area networks (LANs), wide area networks (WANs), the Internet, cloud networks, both wired and wireless networks, digital subscriber line (DSL) networks, frame relay networks, asynchronous transfer mode (ATM) networks, and virtual private networks (VPN). These can be interconnected directly or indirectly. Networks may feature distinct interfaces tailored for internal, external, and management communications, with the option to assign virtual IP addresses (VIPs) to each as needed. The infrastructure of a network comprises various hardware and software components, including but not limited to access points, adapters, buses, ethernet adapters (both physical and wireless), firewalls, hubs, modems, routers, and switches. These components can be located within the network, at its edges, or externally. Additionally, software and computer-executable instructions operate on these components, facilitating network functions. Networks are capable of supporting HTTPS and various other communication protocols suitable for packet-based transmission and communication.

As used herein, Generative Artificial Intelligence (AI) or the like refers to AI techniques that learn from a representation of training data and use it to generate new content that is similar to or inspired by existing data. Generated content may include human-like outputs such as natural language text, source code, images/videos, and audio samples. Generative AI solutions typically leverage open-source or vendor sourced (proprietary) models, and can be provisioned in a variety of ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used in accordance with various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models—Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in the field of biology and medicine. (5) NVIDIA AI Models-Megatron: A large, powerful transformer model designed for natural language processing tasks. (6) IBM AI Models—Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in the field of generative AI. One or more of the foregoing may be used herein as desired. All are considered to be within the sphere and scope of this disclosure.

Generative AI and LLMs can be used in various aspects of this disclosure performing one or more various tasks, as desired, including: (1) Natural Language Processing (NLP):

This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and utilizing large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

By way of non-limiting disclosure, FIG. 1 depicts an architecture diagram showing sample interactions, interfaces, steps, functions, and components in accordance with one or more aspects of this disclosure.

The architecture diagram outlines a system for detecting fake accounts, including modules for Data Collection (100), Feature Extraction (102), Dynamic Feature Optimizer (104), and Provenance-Preserving Analysis (106), which includes Privacy and Security (106A), Data Authenticity (106B), Data Integrity (106C), and Auditability (106D). It integrates a Virtual Environment (108) and employs a Quantum Approximate Optimization Algorithm (110). Optional Features for Analysis (112), Analysis Model (114) with Account Creation Patterns (114A), Social Network Analysis (114B), and Transaction Patterns/Monitoring (114C) are included. It also features Threshold Determination (116) and Account Mitigation (118).

Data Collection (100) involves gathering user information from various sources. This step aims to compile a comprehensive dataset that includes both genuine and fake account data, focusing on user behavior, profile information, and activity patterns. A large and diverse dataset of user information that includes both genuine and fake accounts is gathered. This dataset should have a variety of features related to user behavior, profile information, and activity patterns.

Feature Extraction (102) is the process of analyzing the collected data to identify specific attributes or patterns that can distinguish fake accounts from genuine ones. This can include analyzing posting frequency, engagement levels, profile completeness, time spent online, and other relevant attributes.

Dynamic Feature Optimizer/Generator (104) refers to a system component that uses algorithms to dynamically generate and optimize new features for detecting fake accounts more effectively. This includes adapting features based on changing patterns of account behavior and employing techniques like machine learning to improve detection accuracy. The generation of dynamic features evolves through the integration of algorithms that perform joining, grouping, statistical, and computational analyses. This process is designed to refine the system's capability in accurately pinpointing fake accounts by considering key behavioral signals and interactions such as the timeliness and frequency of user activities, pattern recognition, and engagement metrics. Through the innovative manipulation of data—creating new variables, amalgamating existing ones, or modifying features to better distinguish signal from noise—the model becomes adept at adapting to the ever-changing tactics employed by fraudulent accounts. This agility ensures enhanced detection precision, keeping pace with the dynamic landscape of online behaviors and threats.

Provenance-Preserving Analysis (106) ensures the analysis process maintains the origin and history of data while safeguarding user privacy and data security (106A). It verifies data authenticity (106B), maintaining the accuracy and consistency of data throughout its lifecycle (106C), and supports auditability (106D), allowing for the tracking and verification of data handling and analysis steps. This comprehensive approach not only enhances the detection of fake accounts by utilizing genuine data insights but also ensures that the process adheres to strict data governance and regulatory compliance standards. The Provenance-Preserving Analysis technique is employed to maintain data privacy and security throughout the feature extraction phase. It focuses on anonymizing and safeguarding sensitive user data, ensuring that personal information remains confidential. Simultaneously, it upholds the data's integrity and quality, ensuring that the analysis process does not compromise the authenticity and reliability of the information. This approach balances the need for data protection with the necessity of preserving the data's value for analysis, enabling a secure yet effective examination of user behaviors and patterns.

Quantum simulation enables the generation of more dynamic features in a virtual environment (108). This supports real-time verification patterns, peer comparison verification patterns, content and behavioral analysis, and the combination of multiple patterns. These analysis techniques enhance the accuracy of detecting fake accounts and reduce the risk of false positives. Stated differently, with the support of Quantum Simulation virtual environment system will be able to generate more features dynamically which will help system to do Real-Time Verification Pattern, Peer Comparison Verification Pattern, Content Analysis, Behavioral Analysis, Combining multiple patterns and other analysis techniques which can enhance the accuracy of detecting fake accounts and reduce the risk of false positives Regarding Quantum optimization, Quantum optimization protocols, such as Quantum Approximate Optimization Algorithm (QAOA), are leveraged to optimize the selection and combination of features. This involves mapping the optimization problem onto a Quantum computer and finding the optimal combination of features that maximizes the separation between genuine and fake accounts.

Quantum optimization, simulation, and analysis techniques are employed to enhance feature selection and the accuracy of detecting fake accounts. Quantum Approximate Optimization Algorithm (QAOA) optimizes features by mapping problems onto a Quantum computer. Quantum simulation generates additional features, supporting various verification and analysis patterns to reduce false positives. Quantum analysis identifies fake accounts through detailed pattern analysis. A decision threshold classifies accounts, balancing false positives and negatives. Remedial actions are tailored based on platform policies, and the model iteratively improves by incorporating feedback and additional data, enhancing detection robustness.

Regarding Analysis Model (114), functions and components for Account Creation Patterns (114A), Social Network Analysis (114B), and Transaction Patterns/Monitoring (114C) are provided. Account creation patterns can include identity verification, biometric analysis, digital footprint analysis, two factor authentication, CAPTCHA tests, know your customer, credit bureau checks, and document authentication. Transaction pattern/monitoring can include e-mail and phone verifications, IP address verification, user behavior verification, and session duration and timing analysis. Social network analysis can include social media verification, device and location information, reputation analysis, and browsing history.

Regarding the threshold determination, a decision threshold can be specified to classify an account as genuine or fake based on the prediction scores. This threshold can be determined by considering the trade-off between false positives and false negatives. Based on the identified patterns, a risk score is assigned to each account. Higher scores indicate a higher likelihood of being a fake account.

Depending on the platform's policies, various remedial actions can be taken, and account mitigations can be performed. These may include account suspension, additional verification steps, CAPTCHA challenges, or other security measures to prevent further misuse.

Iterative improvement is provided on the model by incorporating feedback from misclassified accounts or adding additional features or data sources to enhance the accuracy and robustness in identifying fake accounts.

In sum, the architecture diagram presents a sample comprehensive system designed for detecting fake accounts on digital platforms, detailing a multi-faceted approach that encompasses data collection, feature extraction, and optimization processes. It begins with gathering user information to form a diverse dataset, then extracting key features that help differentiate genuine accounts from fake ones. The system employs dynamic feature generation and provenance-preserving analysis to ensure data integrity and privacy. Quantum technologies, including optimization and simulation, are utilized to refine feature selection and generate additional analysis patterns, thereby enhancing detection accuracy. The system also incorporates mechanisms for threshold determination, remedial actions based on platform policies, and iterative improvements through feedback incorporation, aiming to bolster the robustness of fake account detection.

Figure 2:
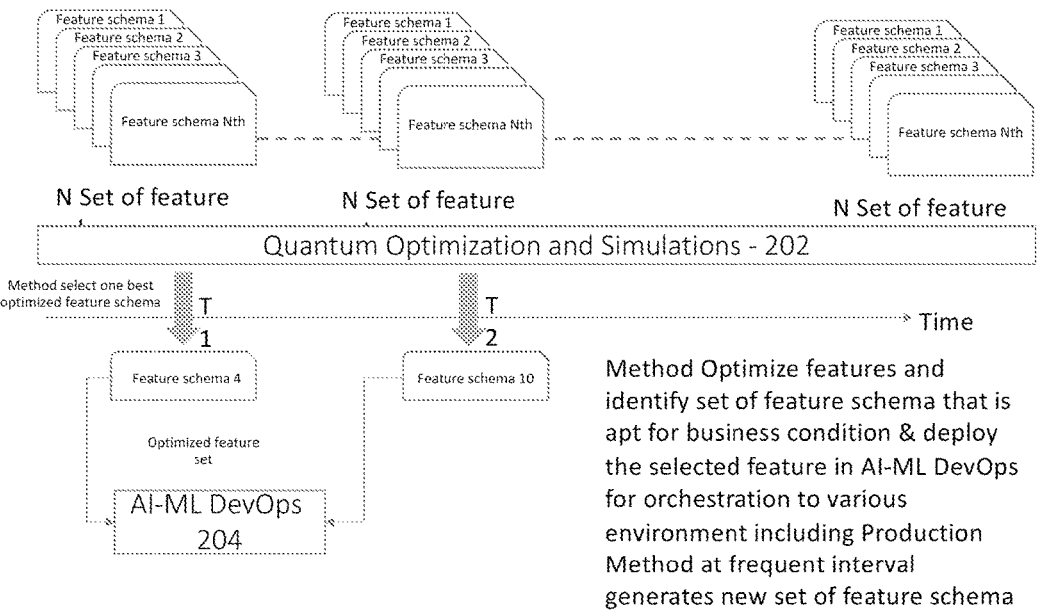
FIG. 2 depicts a Quantum feature optimization engine showing sample interactions, interfaces, steps, functions, and components in accordance with one or more fake-account detection aspects of this disclosure.

By way of non-limiting disclosure, FIG. 2 depicts a Quantum feature optimization engine showing sample interactions, interfaces, steps, functions, and components in accordance with one or more aspects of this disclosure.

As illustrated in this figure, the Quantum feature optimization engine 200 uses a method to optimize features and identifying a schema that matches current business needs, then deploying these selected features into AI-ML DevOps for orchestration across environments, including production. This method regularly updates, generating new sets of feature schema to adapt to changing conditions and enhance detection capabilities dynamically.

Various feature schema 1, 2, 3 . . . . N, are evaluated over time as part of Quantum optimization and simulations component 202. The method selects the best optimized schema at specific time intervals, on demand, continuously, or as needed. The optimized feature set for the selected optimized schema is passed to AI-ML DevOps, which refers to the integration of artificial intelligence (AI) and machine learning (ML) within the DevOps framework. It is the application of DevOps principles—such as continuous integration, continuous delivery, and automated deployment—to the development and deployment of AI and ML models. This approach aims to streamline and automate the end-to-end machine learning lifecycle, from data collection and model training to deployment and monitoring. AI-ML DevOps facilitates closer collaboration between data scientists, developers, and IT operations teams, enhancing the efficiency, scalability, and reliability of AI and ML projects. By leveraging AI-ML DevOps, organizations can more effectively develop, deploy, and maintain AI and ML solutions, leading to faster innovation and improved outcomes. By way of non-limiting disclosure, FIG. 3 depicts dynamic feature optimization showing sample interactions, interfaces, steps, functions, and components in accordance with one or more aspects of this disclosure.

Figure 3:
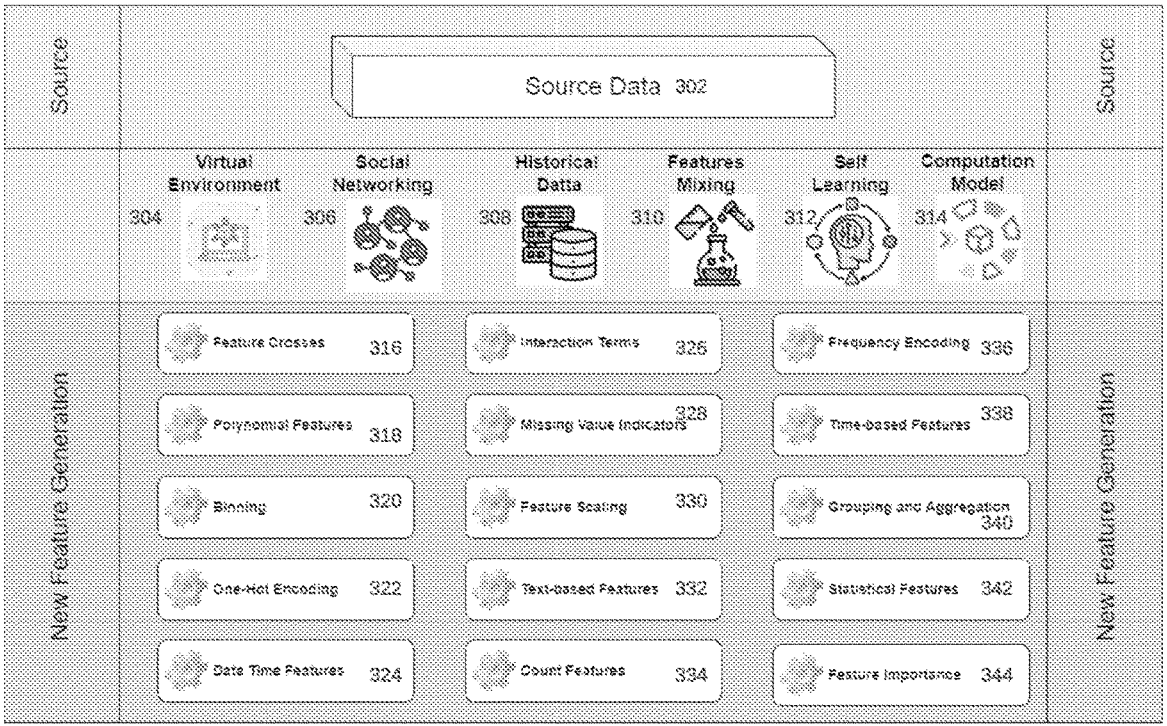
FIG. 3 depicts dynamic feature optimization showing sample interactions, interfaces, steps, functions, and components in accordance with one or more fake-account detection aspects of this disclosure.

FIG. 3 in illustrates the Dynamic Feature Optimization process, identified as item 300. It begins with Source Data (302), proceeds through a Virtual Environment (304), involves Social Networking (306) and Historical Features Data (308), and includes steps such as Mixing (310), Self-Learning Model (311), and various feature engineering techniques like Feature Crosses (316), Polynomial Features (318), and Binning (320), among others. This comprehensive diagram details methods for enhancing feature sets, including One-Hot Encoding (322), Date Time Features (324), and Interaction Terms (326), extending to Feature Scaling (330), Text-based Features (332), and Count Features (334). The process aims to refine data for improved fake account detection through advanced computational techniques.

More specifically, new feature generation can include, inter alia: feature crosses 316, polynomial features 318, binning 320, one hot encoding 322, date time features 324, interaction terms 326, missing value indicators 328, feature scaling 330, text based features 322, count features 334, frequency encoding 336, time based features 338, grouping and aggregation 340, statistical features 342, and feature importance 344.

The new feature generation methods referenced above can be under as:

a. Feature Crosses: Creating new features by combining existing features through feature crosses, such as combining "Var1" and "Var1" to create "Var1_Var2".

b. Polynomial Features: Creating new features by generating polynomial combinations of existing numerical features, such as creating "income^2" or "income^3" based on the "income" feature.

c. Binning: Creating new categorical features by dividing numerical features into different bins, such as creating "number_group" based on different number ranges.

d. One-Hot Encoding: Creating new binary features for each unique category in an existing categorical feature, such as creating "is_country_US" or "is_country_UK" based on the "country" feature.

e. DateTime Features: Creating new features based on dates and times, such as day of the week, month, season, or time of the day.

f. Interaction Terms: Creating new features by introducing interaction terms between different features, such as creating "price_rating_interaction" by multiplying "product_price" and "product_rating".

g. Missing Value Indicators: Creating new features to indicate whether a particular feature has missing values or not, which can be informative in handling missing data.

h. Feature Scaling: Creating new features by applying scaling techniques like normalization or standardization on existing features to capture different statistical properties of the data.

i. Text-based Features: Creating new features like word counts, term frequencies, or TF-IDF scores based on text data to capture relevant information present in the text.

j. Count Features: Creating new features by counting the occurrences of certain values in a categorical feature, such as creating "num_products_in_category_A" or "num_products_in_category_B" based on "product category".

k. Frequency Encoding: Creating new features by encoding categorical variables based on their frequency of occurrence to capture the importance or popularity of certain categories.

l. Grouping and Aggregation: Creating new features by grouping data based on certain criteria and applying aggregation functions like sum, mean, max, or min on numerical features within each group to capture group-specific characteristics.

m. Statistical Features: Creating new features by calculating various statistical properties of numerical features, such as mean, median, standard deviation, skewness, or kurtosis.

n. Time-based Features: Creating features like time differences, time lags, or rolling averages based on temporal data to capture trends or patterns over time.

o. Feature Importance: Creating new features by selecting the most important features from the existing metadata using techniques like feature selection or feature importance scores, which can be used to enhance model performance.

By way of non-limiting disclosure, FIG. 4 depicts a sample functional flow diagram in accordance with one or more aspects of this disclosure as it relates to provenance preserving analysis.

The figure outlines a method for provenance-preserving analysis, detailing steps from defining analysis goals (400) to communicating results with preserved provenance (410). It starts with setting clear objectives (400), collecting data and capturing its provenance (402), performing the analysis with appropriate techniques (404), preserving provenance information throughout the process (406), validating and verifying the results to ensure they meet the set goals (408), and finally, communicating the outcomes along with the provenance information to stakeholders (410). This structured approach ensures data's origin and transformations are meticulously tracked and documented.

The process depicted in FIG. 4 is an analytical method that emphasizes the importance of preserving the origin and history of the data throughout the analysis. Each step, from initial goal setting to final communication, ensures that the data's provenance—its lineage and transformations—is meticulously maintained. This method is beneficial in contexts where authenticity and traceability of data are vital, such as in fraud detection or quality assurance. By validating and verifying the analysis against established goals, the method guarantees the results are both accurate and trustworthy. Finally, by communicating the outcomes along with detailed provenance, stakeholders can fully understand and trust the analysis process and conclusions.

By way of non-limiting disclosure, FIG. 5 depicts a sample functional process diagram in accordance with one or more aspects of this disclosure.

At a high level, this figure outlines a methodological flow for detecting fake accounts on digital platforms, starting with conducting a comprehensive analysis of data provenance (502), dynamically generating new features (504), employing Quantum optimization algorithms (506), utilizing Quantum simulation (508), conducting a comprehensive analysis that combines provenance telemetry and dynamic feature analysis (510), optimizing features using Quantum simulation (512), and deploying the selected features across various environments (514), culminating in the completion of the process (516). This flowchart illustrates a structured approach to leveraging Quantum computing technologies for enhancing fake account detection capabilities.

More specifically, the method for detecting fake accounts on digital platforms comprises several steps, starting with a comprehensive analysis of data provenance to identify the origins and history of data, which helps in pinpointing potential fake accounts. It then moves to dynamically generate new features using various algorithms, enhancing the ability to detect fake accounts through analysis of user behavior and interactions. Quantum optimization algorithms, specifically Quantum Annealing, are employed to refine the feature selection process. Quantum simulation is utilized to further generate advanced features, improving detection accuracy. The method involves a thorough analysis that integrates provenance, telemetry, and dynamic feature analysis, optimizing features for deployment across different environments using AI-ML DevOps, ensuring the system adapts to current business needs effectively.

Further, the method can refine fake account detection on digital platforms by incorporating a filtering mechanism into the data provenance analysis, prioritizing sources with a history of fraudulent activities. This includes using a machine learning model for dynamic feature generation that adjusts based on filtering outcomes. Quantum optimization algorithms are tailored to select features with a proven track record in detecting fake accounts, complemented by a feedback loop from Quantum simulation results to fine-tune the process. Environmental variables are factored into simulations for realistic testing. Comprehensive analysis findings are displayed on a dashboard for immediate authenticity checks. Anomaly detection algorithms, updated in real-time from Quantum data, identify behavioral deviations, with an automatic adjustment of detection thresholds based on fraud severity. Finally, optimized features are deployed across platforms using cloud-based AI-ML DevOps for efficient and scalable threat mitigation.

Figure 6:
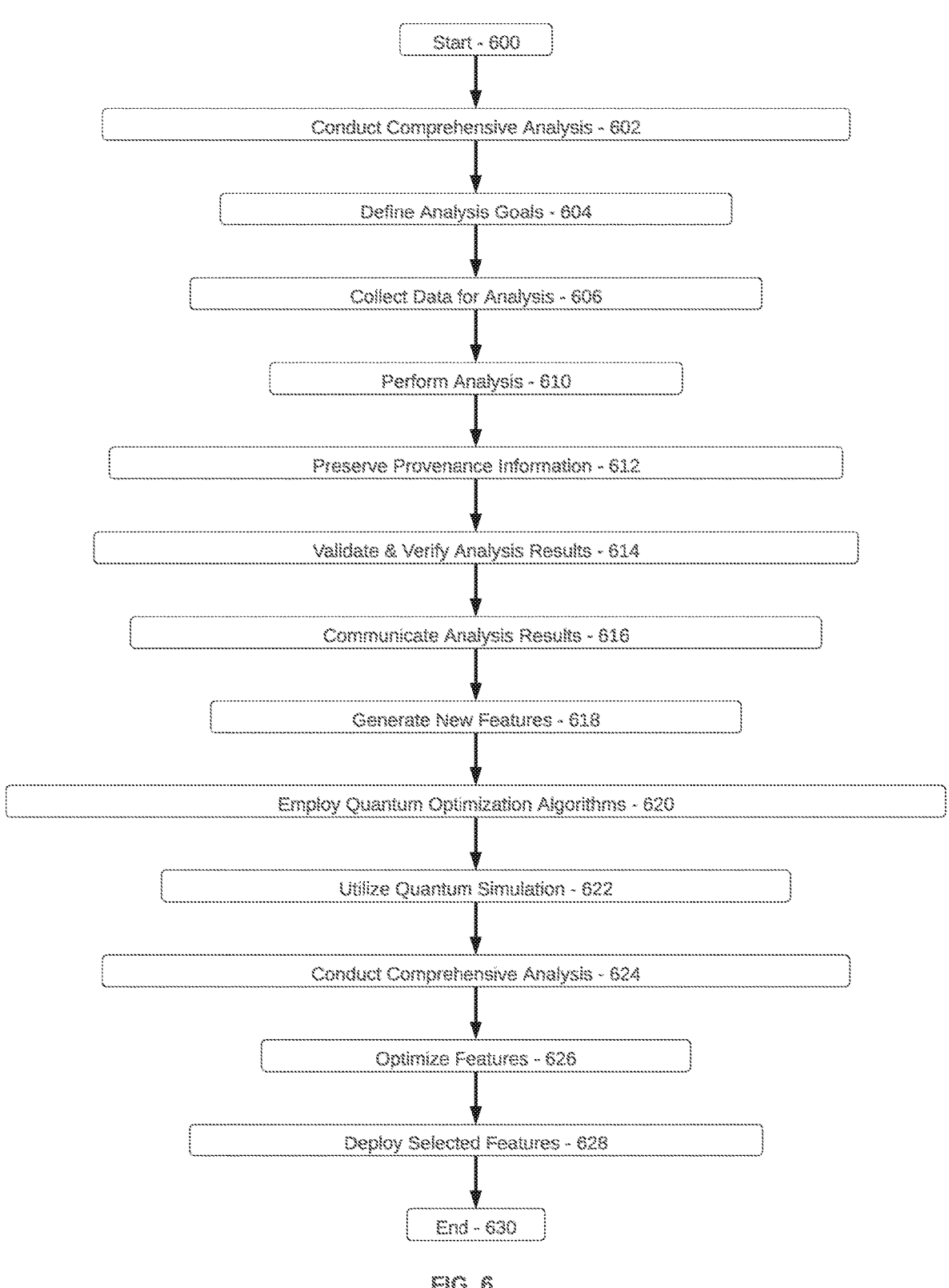
FIG. 6 depicts a sample functional process diagram in accordance with one or more fake-account detection aspects of this disclosure.

By way of non-limiting disclosure, FIG. 6 depicts a sample functional process diagram in accordance with one or more aspects of this disclosure.

The figure illustrates a method for detecting fake accounts on digital platforms, starting with a comprehensive analysis (602) that includes defining analysis goals (604), collecting data (606), performing the analysis (610), preserving provenance information (612), validating and verifying results (614), and communicating the results (616). It then advances to generating new features (618), employing Quantum optimization algorithms (620), utilizing Quantum simulation (622), conducting a comprehensive analysis again (624), optimizing features (626), and deploying the selected features (628), culminating the process (630).

The method can encompass an intricate process for detecting fake accounts on digital platforms, beginning with a detailed analysis of data provenance to discern the origins and history of data, identifying potentially fraudulent activities. It involves setting clear objectives, gathering and documenting data along with its provenance, and employing specific analytical techniques to extract meaningful insights. The preservation of provenance information throughout this process is crucial, as is the validation and verification of the analysis results. These findings are then communicated to stakeholders, illustrating the data's journey. Additionally, the method leverages dynamic feature generation, Quantum optimization, and Quantum simulation to enhance feature selection and generate advanced features for accurate fake account detection. This comprehensive approach culminates in the optimization of features for deployment across various digital environments, facilitated by AI-ML DevOps tools for efficient orchestration, ensuring the system's adaptability and effectiveness in identifying fake accounts.

The method for detecting fake accounts on digital platforms can involve several systematic steps. It begins with conducting a comprehensive analysis of data provenance to trace the origin, ownership, and processing history of data. This step is crucial for identifying potential sources of fake accounts and suspicious activities. The comprehensive analysis includes defining analysis goals and objectives to understand critical aspects of the data's origin, ownership, or lineage, ensuring these aspects are preserved in the analysis results. Data for analysis is collected along with capturing provenance information, which includes metadata about data sources, transformations, and intermediate results.

The analysis is performed using appropriate techniques or algorithms to derive insights or results from the collected data and provenance information. Throughout the analysis, provenance information is preserved by systematically recording the steps, operations, and transformations applied to the data and documenting any intermediate or final outputs. This process is vital for validating and verifying the analysis results to ensure their quality, accuracy, and alignment with the defined analysis goals. The analysis results, along with the preserved provenance information, are then communicated to relevant stakeholders through documentation, visualizations, or reports, showcasing the data's origin, lineage, and transformations during the analysis process.

To enhance the detection process, the method includes generating new features dynamically through algorithms that utilize joining, grouping, statistical analysis, and computational analysis. These are aimed at effectively identifying fake accounts based on factors like event recency, pattern recognition, and user interactions. Quantum optimization algorithms, such as Quantum Annealing, are employed to enhance the feature selection process, leveraging Quantum computing's parallel processing capabilities to explore multiple feature combinations simultaneously for optimized selection. Quantum simulation is utilized to dynamically generate advanced features, facilitating real-time verification patterns, peer comparison verification patterns, content analysis, behavioral analysis, and the combination of multiple patterns. This improves the accuracy of detecting fraudulent accounts while effectively mitigating the potential for false positives.

The comprehensive analysis is conducted by combining provenance, telemetry, and dynamic feature analysis to leverage the strengths of each technique towards a more holistic and robust fake account detection. Lastly, features are optimized using Quantum simulation to identify a set of feature schema that is apt for the current business condition. The selected features are then deployed across various environments, including production, through AI-ML DevOps for effective orchestration. This methodical approach ensures a thorough and effective mechanism for detecting fake accounts on digital platforms.

Figure 7:
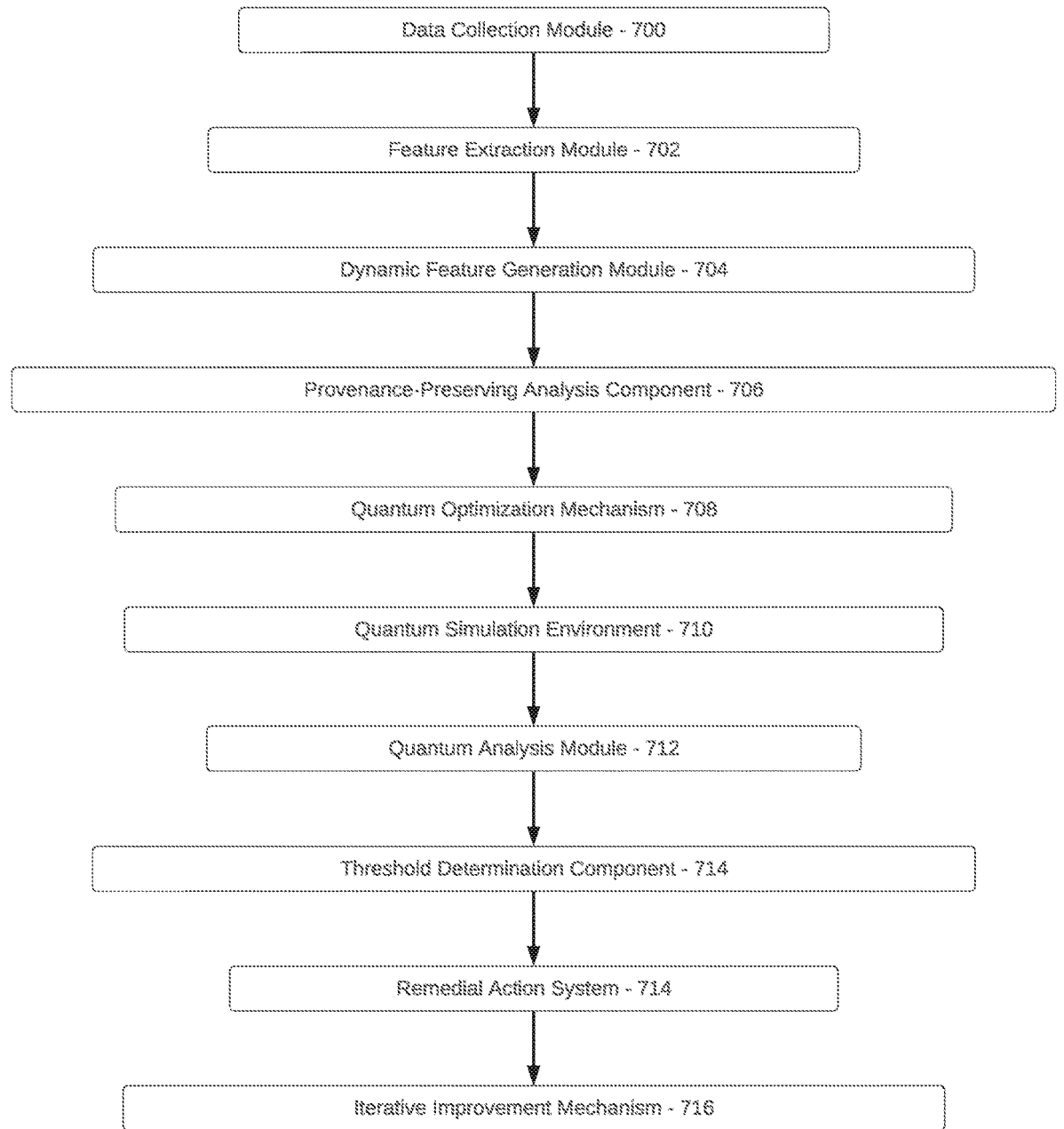
FIG. 7 depicts another sample functional process diagram in accordance with one or more fake-account detection aspects of this disclosure.

By way of non-limiting disclosure, FIG. 7 depicts another sample functional process diagram in accordance with one or more aspects of this disclosure.

The figure illustrates a comprehensive system for detecting fake accounts on digital platforms, featuring several key components: Data Collection Module (700) gathers diverse user information; Feature Extraction Module (702) discerns genuine from fake accounts using behavioral patterns; Dynamic Feature Generation Module (704) creates new features for identification; Provenance-Preserving Analysis Component (706) ensures data integrity; Quantum Optimization Mechanism (708) and Quantum Simulation Environment (710) enhance feature selection; Quantum Analysis Module (712) analyzes account patterns; Threshold Determination Component (714) sets classification criteria; Remedial Action System (716) addresses detected accounts; Iterative Improvement Mechanism (716) refines the detection model.

Figure 8:
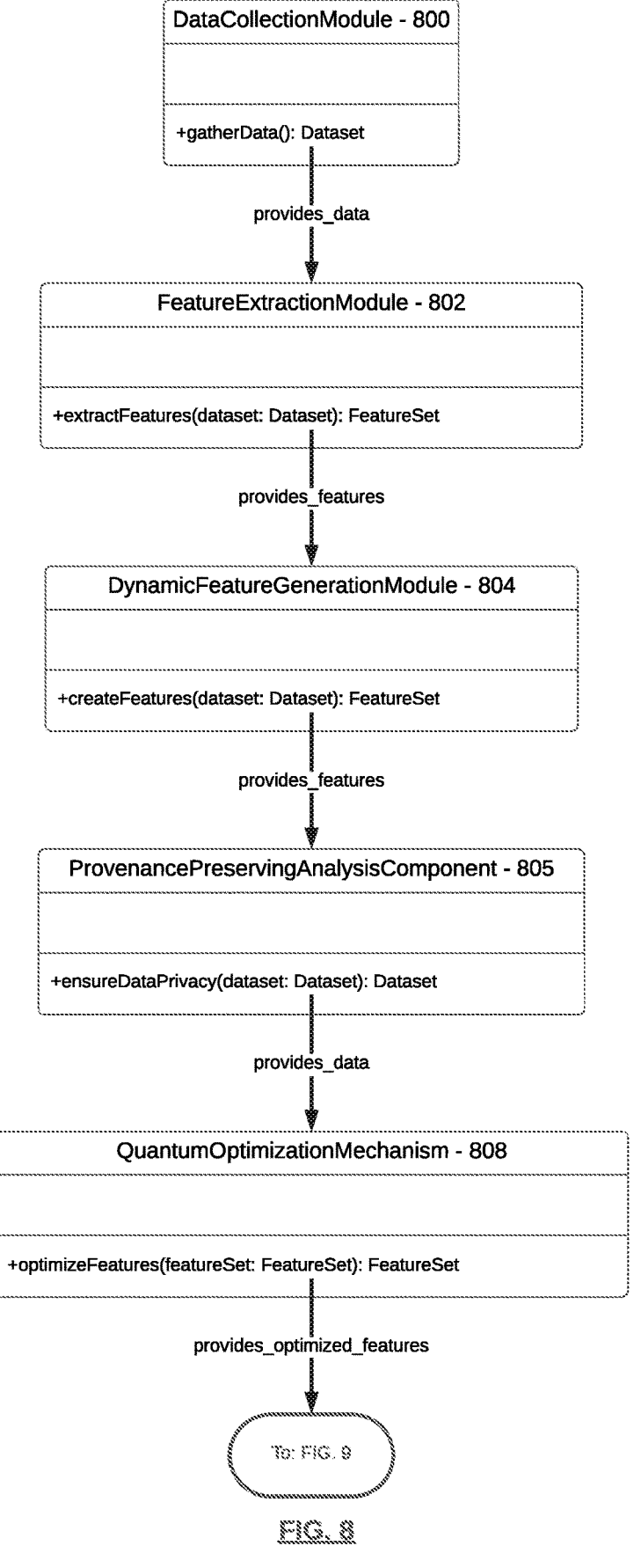

By way of non-limiting disclosure, FIGS. 8-9 collectively depict a class diagram for a sample system in accordance with one or more aspects of this disclosure.

The class diagrams detail components of a sample system designed for optimizing and analyzing digital interactions, within the context of detecting fake accounts or analyzing data in a complex system. Key elements include a Quantum Simulation Environment, Quantum Analysis Module, Threshold Determination Component, Remedial Action System, and an Iterative Improvement Mechanism. Each component is responsible for specific operations such as generating additional features, analyzing account patterns, determining thresholds for action, executing remedial actions based on analysis, and refining the model based on feedback, respectively. These diagrams collectively represent a structured approach to processing and analyzing data using Quantum computing techniques and iterative feedback loops for continuous improvement.

Thus, as illustrated in the figures and described above, the disclosed systems and methods leverage Quantum simulation to enhance the detection of fake accounts. By analyzing the provenance of data and generating dynamic features, the system can identify potential fake accounts more effectively. The use of Quantum-assisted optimization algorithms further improves the efficiency and accuracy of the detection model. The process involves conducting a comprehensive analysis of the provenance of the data, tracking its origin and processing history. This analysis helps identify potential sources of fake accounts and suspicious activities. Additionally, dynamic features are generated through various algorithms, considering factors like event recency and frequency, pattern recognition, and customer interaction. By utilizing Quantum-assisted optimization algorithms, the model explores multiple combinations of features simultaneously, resulting in faster and more accurate optimization. The combination of provenance analysis, dynamic feature generation, and Quantum-assisted optimization enhances the efficiency and accuracy of fake account detection.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for detecting fake accounts on digital platforms through the integration of Quantum computing and artificial intelligence technologies, the method comprising the steps of:

initiating a data provenance analysis to systematically trace and document origin, ownership, and historical transformations of data collected from digital platforms to identify potential sources of fraudulent activities, wherein the data provenance analysis employs advanced cryptographic techniques to ensure confidentiality and integrity of the data;

implementing an algorithmic process for dynamic generation of detection features, wherein said process utilizes real-time analytics of user behaviors, interactions, and engagement patterns to adaptively generate new features that accurately reflect current trends and tactics employed by fraudulent entities, incorporating machine learning models that adjust detection parameters in real-time based on evolving online behaviors;

applying Quantum optimization algorithms, specifically leveraging Quantum Annealing and Quantum Approximate Optimization Algorithm (QAOA), to expedite and enhance a selection process of relevant detection features by performing parallel computations and exploring vast combinations of potential features, thereby significantly reducing optimization time while increasing accuracy of feature selection;

engaging Quantum simulation techniques to create and refine advanced detection features, wherein the simulation facilitates development of features capable of performing analyses for real-time verification, peer comparison, and behavioral analysis, and enables the simulation of adversarial scenarios to test and improve resilience of a detection system against novel and sophisticated fraud techniques;

conducting a comprehensive and integrated analysis that amalgamates insights gained from data provenance, telemetry data, and the dynamically generated and Quantum-optimized features, to form a robust and holistic understanding of a digital environment, ensuring a thorough and nuanced approach to the detection of fake accounts;

optimizing the generated features through further Quantum simulations to finalize a set of highly effective detection features, including evaluating the performance of the features in diverse scenarios and refining them based on their efficacy in identifying fake accounts to minimize false positives and negatives, thereby ensuring reliability and trustworthiness of the detection process;

deploying the optimized features across various digital platforms through an automated AI-ML DevOps pipeline, which facilitates seamless integration and continuous deployment of detection capabilities, ensuring that the can be dynamically updated in response to emerging threats or changes in the digital environment, including provisions for incremental updates and real-time adjustments without necessitating system downtime; and establishing a real-time verification and analysis component that employs the deployed features to promptly identify and validate potential threats, incorporating a feedback mechanism that allows for the continuous improvement of the detection system based on outcomes of verified threats, thereby maintaining high accuracy and effectiveness in the detection of fake accounts while minimizing impact on legitimate users and operations of the digital platform.

2. The method of claim 1, further comprising the step of enhancing the data provenance analysis with artificial intelligence (AI)-based anomaly detection algorithms designed to automatically flag data inconsistencies and potential fraudulent patterns within the provenance data, thereby improving the initial filtering process for identifying suspicious activities and sources of fake accounts.

3. The method of claim 2, wherein the dynamic generation of detection features further includes natural language processing (NLP) techniques to analyze textual content within user interactions for sentiment analysis, keyword spotting, and contextual understanding, enhancing identification of nuanced and sophisticated fraudulent activities based on content analysis.

4. The method of claim 3, wherein the Quantum optimization algorithms are tailored to prioritize features based on their demonstrated effectiveness in detecting emerging threats, incorporating a machine learning feedback loop that dynamically adjusts feature prioritization based on the latest trends in fraudulent behavior identified through ongoing analysis and Quantum simulation results.

5. The method of claim 4, wherein the Quantum simulation for refining advanced detection features includes a component for simulating social network structures and interaction patterns to identify and understand the mechanisms of spread and influence among fake accounts, facilitating the development of features that can detect coordinated inauthentic behavior across the platform.

6. The method of claim 5, further including the deployment of an adaptive threshold setting mechanism within the real-time verification and analysis component, wherein the mechanism adjusts sensitivity of the detection system based on current platform dynamics and threat levels, ensuring optimal balance between the detection of fake accounts and the minimization of false positives, thereby maintaining user trust and platform integrity.

7. A method for detecting fake accounts on digital platforms comprising the steps of:

conducting a comprehensive analysis of data provenance to identify potential fraudulent activities by tracing origin, ownership, and processing history of data, wherein the data provenance analysis includes capturing metadata on data sources, transformations, and intermediate results to preserve lineage of the data;

dynamically generating new detection features based on real-time analysis of user behaviors and interactions, wherein the dynamic generation employs algorithms to create features that adapt to evolving tactics used by fraudulent accounts;

utilizing Quantum optimization algorithms, including Quantum Annealing, to refine a feature selection process, wherein the Quantum optimization leverages parallel processing capabilities of Quantum computing to explore and optimize multiple feature combinations simultaneously;

employing Quantum simulation to further generate advanced detection features, facilitating sophisticated analysis methods including real-time verification, peer comparison verification, content analysis, and behavioral analysis to improve accuracy of fraud detection while minimizing false positives;

conducting a comprehensive analysis that integrates provenance, telemetry, and dynamic feature analysis to develop a holistic understanding of fraudulent account activities;

optimizing the generated features through Quantum simulation for deployment across various digital environments, wherein the optimization process selects a most effective feature schema for current business conditions and employs AI-ML DevOps for efficient feature deployment; and implementing a real-time verification and analysis component to ensure prompt and accurate validation of detected threats, thereby minimizing impact on legitimate users and swiftly neutralizing potential risks, wherein a real-time component adapts to changing tactics by malicious actors.

8. The method of claim 7, wherein the dynamic feature generation process incorporates machine learning models to adjust detection features based on outputs from the data provenance analysis and the real-time analysis of user data, thereby ensuring a detection mechanism remains effective against adaptive strategies by fraudulent accounts.

9. The method of claim 7, further comprising a filtering mechanism to prioritize data sources associated with historical fraudulent activities, wherein the filtering mechanism refines the process of feature generation by adjusting machine learning model parameters based on historical data analysis.

10. The method of claim 7, wherein Quantum-assisted optimization includes tailoring the selection of detection features strongly correlated with indicators of fake accounts, further refined by a feedback loop from Quantum simulation results to improve feature generation and selection based on environmental variables and real-world conditions.

11. The method of claim 7, wherein the deployment of optimized features across multiple platforms is facilitated using cloud-based AI-ML DevOps tools, enabling scalable and prompt adaptation to detected fraudulent activities and threat mitigation.

12. The method of claim 7, wherein the comprehensive analysis of data provenance further includes utilizing encryption and hashing techniques to secure data during processing, ensuring privacy and security of user information while maintaining the integrity and authenticity of the analysis.

13. The method of claim 7, further comprising employing a machine learning model within the dynamic feature generation process that is capable of self-adjustment based on continuous feedback from the Quantum simulation results, thereby enhancing prediction and detection of fake accounts based on evolving patterns and tactics used by malicious actors.

14. The method of claim 7, wherein the Quantum simulation for generating advanced detection features includes simulating adversarial attack scenarios to test and improve the resilience of the detection features against sophisticated fraud techniques, ensuring the system's effectiveness under various conditions.

15. The method of claim 7, further including the step of integrating anomaly detection algorithms updated in real-time from Quantum simulation data, wherein these algorithms are designed to spot deviations from normal user behavior, and detection thresholds are automatically adjusted based on severity and frequency of detected fraudulent activities.

16. The method of claim 7, wherein the deployment of optimized features across various digital environments is performed in a manner that supports incremental updates without system downtime, ensuring that detection capabilities can be dynamically updated in response to emerging threats while minimizing disruption to platform operations.

17. A system for detecting fake accounts on digital platforms, comprising at least one microprocessor; and at least one memory communicatively coupled to the at least one microprocessor, the at least one memory bearing computer-executable instructions that, when executed by the at least one microprocessor, cause the system to provide:

a Data Provenance Module configured to systematically trace, document, and analyze origin, ownership, and historical transformations of data collected from digital platforms, employing cryptographic techniques to ensure data confidentiality and integrity, and equipped with AI-based anomaly detection algorithms for identifying suspicious activities;

a Dynamic Feature Generation Engine utilizing real-time analytics and machine learning models to adaptively generate detection features based on user behaviors, interactions, and engagement patterns, further incorporating natural language processing (NLP) techniques for textual content analysis;

a Quantum Computing Module comprising Quantum optimization algorithms, including Quantum Annealing and Quantum Approximate Optimization Algorithm (QAOA), designed to expedite a selection process of detection features by performing parallel computations to explore vast combinations of potential features, and equipped with a feedback loop mechanism for dynamic adjustment based on emerging fraud trends;

a Quantum Simulation Unit tasked with creating and refining advanced detection features capable of sophisticated analyses, including real-time verification and behavioral analysis, and simulating adversarial scenarios to test resilience of the detection system against sophisticated fraud techniques, further including a social network simulation component for detecting coordinated inauthentic behavior;

an Integrated Analysis System that amalgamates insights from the Data Provenance Module, telemetry data, and the features generated by the Dynamic Feature Generation Engine and optimized by the Quantum Computing Module, to form a comprehensive understanding of a digital environment for nuanced detection of fake accounts;

an AI-ML DevOps Pipeline for automated deployment of optimized detection features across various digital platforms, facilitating seamless integration, continuous update capabilities, and real-time adjustments without system downtime, ensuring agility and responsiveness to emerging threats; and a Real-time Verification and Analysis Component equipped with deployed features for the identification and validation of potential threats, incorporating an adaptive threshold setting mechanism to balance detection sensitivity based on platform dynamics and threat levels, and a feedback mechanism for continuous system improvement based on the outcomes of verified threats.

18. The system of claim 17, further comprising:

an Enhanced Security Layer integrated into the Data Provenance Module, utilizing advanced encryption standards (AES) and secure hashing algorithms (SHA) to protect data privacy and integrity during the tracing and documenting process, and a Behavioral Anomaly Detection Subsystem within the Real-time Verification and Analysis Component, configured to use deep learning models to automatically identify and alert on unusual user behavior patterns indicative of fake account activities, leveraging continuous learning from detected anomalies to refine detection accuracy over time.

19. The system of claim 18, wherein the Dynamic Feature Generation Engine includes:

a Sentiment Analysis Unit employing advanced NLP models to discern emotional tones and intentions in textual content, enabling the identification of manipulative or deceptive language patterns common in fake account interactions, and a Contextual Analysis Module designed to interpret a significance of user interactions within specific platform contexts, enhancing generation of features that capture sophisticated indicators of fake accounts based on contextual relevance.

20. The system of claim 17, further equipped with:

a Cross-Platform Integration Framework enabling the system to extend its fake account detection capabilities across multiple digital platforms by standardizing feature generation, optimization, and deployment processes, allowing for sharing of intelligence and detection strategies among different platforms, and a User Feedback Collection Module designed to gather direct input from platform users regarding suspected fake accounts, incorporating this user-generated data into the Real-time Verification and Analysis Component to enrich detection mechanisms with human insights, thereby improving adaptability and effectiveness in real-world conditions.

* * * * *